Jan. 7, 1930.　　　　F. B. BELL　　　　1,742,193
PROCESS OF FINISHING WHEELS
Filed July 14, 1924
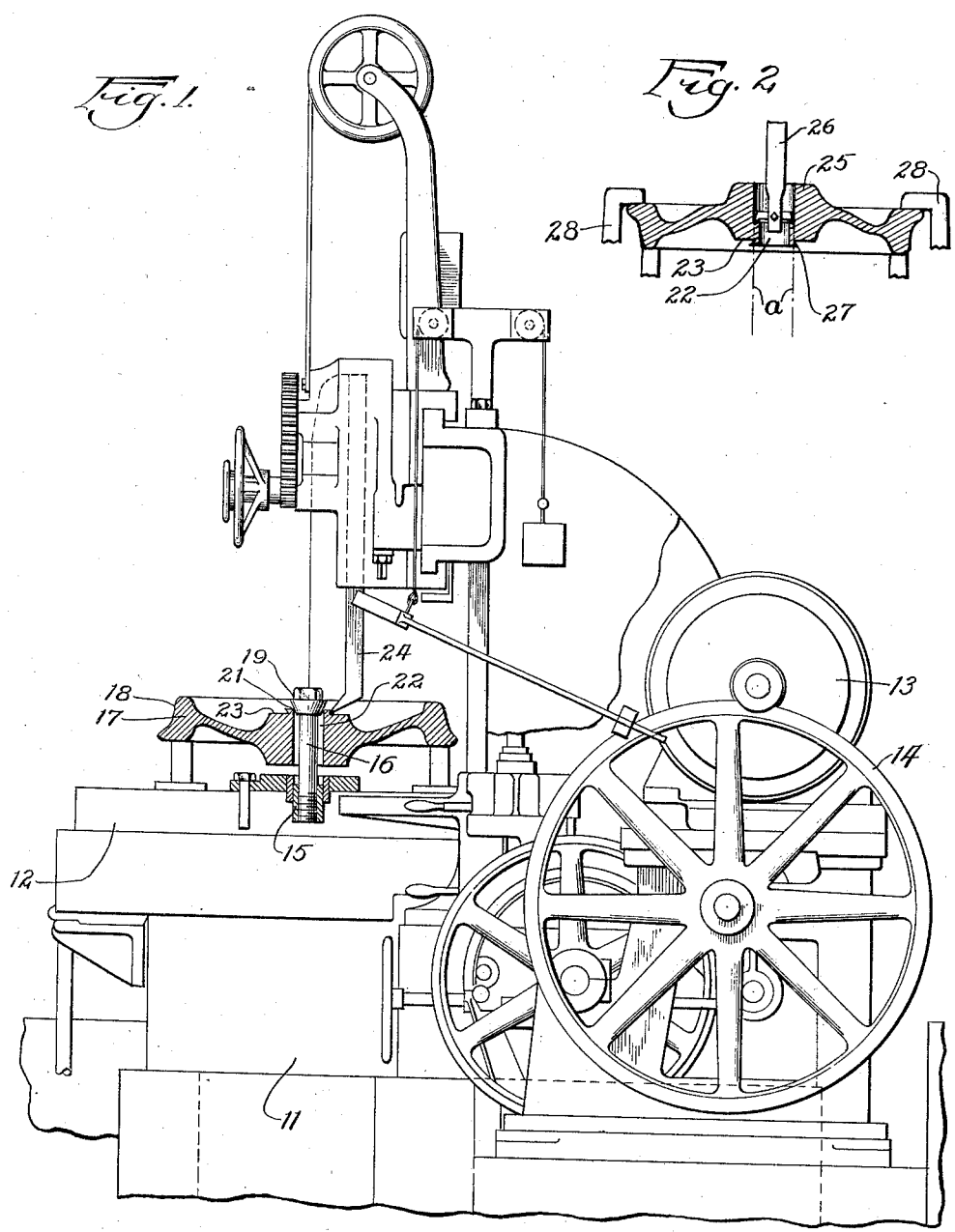
Inventor:
Frank B. Bell
By Munday, Clarke & Carpenter Patented Jan. 7, 1930

1,742,193

UNITED STATES PATENT OFFICE

FRANK B. BELL, OF PITTSBURGH, PENNSYLVANIA, ASSIGNOR TO EDGEWATER STEEL COMPANY, OF PITTSBURGH, PENNSYLVANIA, A CORPORATION OF PENNSYLVANIA

PROCESS OF FINISHING WHEELS

Application filed July 14, 1924. Serial No. 725,778.

This invention relates in general to the machining or finishing of car wheels and other similar articles. In the manufacture of car wheels, and particularly rolled steel wheels, it has been the custom to mount the wheel upon the rotating table of the boring mill or other apparatus and there secure it by a bolt passed through the hub or central opening. In this position the tread or outer surface of the wheel is machined, thereafter the bolt is removed and the wheel clamped at its rim and the presented face of the hub machined. The wheel is then turned over and clamped at the rim and the opposite hub face machined. In the one position or the other the central hub opening is bored, and like operations, of course, are necessary in the manufacture of other similar articles.

My invention has for its principal object the provision of a process and means for machining car wheels and other objects with merely two clamping operations. Differently stated, it may be said that the purpose of the invention is a process which will permit the machining of a face of the hub with the same clamping employed for the machining of the tread of the rim.

Numerous other objects and advantages of the invention will be better understood from the accompanying drawings taken with the following description, which together disclose a preferred embodiment of an apparatus embodying my invention and for use in connection with my improved process.

Referring to the drawings,

Figure 1 is a side elevation of the operative portion of a mill for machining car wheels, and Fig. 2 is a small detail section showing the boring operation.

On the drawings reference character 11 designates the frame of the mill, reference character 12 the usual rotating table. A motor 13 through suitable gearing 14 causes the table to rotate in the usual manner. The table is provided at its axial center with a threaded collar 15 in which may be positioned a clamping bolt 16 for securing the car wheel (indicated at 17) in position for machining its tread surface 18. This is the usual first position of the wheel in the mill.

The bolt 16 is preferably provided with a tapered portion 19 which may be a collar, if desired, upon the bolt. This tapered portion or collar engages the edge 21 about the central or hub opening 22. While the wheel is in this position the upper or presented face 23 is machined by a tool 24 up to close to the collar. I provide the opening 22 of less diameter at the face 23 than is desired in the finished wheel. After the tread and the face 23 have been machined in the manner mentioned, the bolt 19 is removed and the wheel turned upside down from its position in Fig. 1 to the position shown in Fig. 2. Here it is clamped to the table by clamps 28 leaving free the face 25 of the hub. The central opening 22 is now bored by a boring tool 26 to a diameter, as indicated at $a$, which will remove the portion 27 left about the opening 22 when the face 23 was machined as before described. The face 25 may now be machined or for that matter may be machined before the boring of the hole and it will be apparent that both faces of the hub and the tread have been machined with two clamping engagements and that by my process I have eliminated the necessity of clamping the wheel rim while the wheel is in the position shown in Fig. 1 to permit surfacing of the face 23.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. The process of machining car wheels, which comprises, clamping the wheel by a member contacting solely with the walls of the hub opening, machining the tread of the wheel, and a hub face adjacent said opening leaving a collar of less diameter than the diameter of the finished hub opening, then inverting the wheel and clamping it at the rim, boring the hub opening to remove the unfinished portion of the hub face at the machined side of said hub, and machining the remaining hub face.

2. The process of machining car wheels, which comprises, clamping the wheel by means of a member contacting solely with the inner wall of the hub opening, machining the tread of the wheel and a portion of the hub face adjacent said opening, then inverting the wheel and clamping it at the rim, and then boring the hub opening in a manner to remove the unfinished portion of the hub face at the previously machined side of said hub and machining the remaining hub face.

3. The process of machining car wheels, which comprises, machining the tread of the wheel and the outer portions of the hub face adjacent said opening leaving an unfinished portion consisting of an uncut collar, inverting the wheel, boring the hub in a manner to remove the unfinished portion of the hub face previously machined and machining the remaining hub face.

FRANK B. BELL.